US012613002B2

(12) United States Patent
Patel et al.

(10) Patent No.: US 12,613,002 B2
(45) Date of Patent: Apr. 28, 2026

(54) SYSTEMS AND METHODS FOR DISPENSING CRYOGENIC LIQUID FUEL AS A GAS AT CONTROLLED TEMPERATURE USING CRYOGENIC FLUID

(71) Applicant: PLUG POWER INC, Latham, NY (US)

(72) Inventors: Nikunj Patel, Latham, NY (US); Allen Adriani, Latham, NY (US)

(73) Assignee: PLUG POWER INC., Latham, NY (US)

( * ) Notice: Subject to any disclaimer, the term of this patent is extended or adjusted under 35 U.S.C. 154(b) by 350 days.

(21) Appl. No.: 18/330,551

(22) Filed: Jun. 7, 2023

(65) Prior Publication Data

US 2023/0392753 A1 Dec. 7, 2023

Related U.S. Application Data

(60) Provisional application No. 63/365,972, filed on Jun. 7, 2022.

(51) Int. Cl.
*F17C 7/04* (2006.01)

(52) U.S. Cl.
CPC ........ *F17C 7/04* (2013.01); *F17C 2205/0323* (2013.01); *F17C 2205/0376* (2013.01);
(Continued)

(58) Field of Classification Search
CPC ...... F17C 2205/0323; F17C 2205/0376; F17C 2221/012; F17C 2223/0161;
(Continued)

(56) References Cited

U.S. PATENT DOCUMENTS 5,771,946 A * 6/1998 Kooy ........................ F17C 6/00 141/2
6,614,336 B2 9/2003 Galli
(Continued)

FOREIGN PATENT DOCUMENTS

CN 113483259 A 10/2021
JP 2016089942 A 5/2016

OTHER PUBLICATIONS

PCT/US2023/068293—International Preliminary Report dated Dec. 10, 2024, 7 pp.

(Continued)

*Primary Examiner* — Filip Zec
(74) *Attorney, Agent, or Firm* — Heslin Rothenberg Farley & Mesiti P.C.

(57) ABSTRACT

A method for mixing and dispensing fuel includes flowing fuel from a tank toward a first flow path and a second flow path and separating the fuel into a first stream and a second stream. The method includes flowing the first stream in the first flow path through a vaporizer to a heat exchanger, flowing the second stream in the second flow path to the heat exchanger, flowing the first stream through a warm portion of the heat exchanger to exchange heat with the second stream, and flowing the second stream through a cold portion of the heat exchanger to exchange heat with the first stream. The method further includes flowing the first stream and the second stream from the heat exchanger to a mixing point, combining the first stream and the second stream to obtain a target stream, and dispensing the target stream through a dispenser.

19 Claims, 2 Drawing Sheets

(52) U.S. Cl.
CPC .................. *F17C 2221/012* (2013.01); *F17C 2223/0161* (2013.01); *F17C 2227/0135* (2013.01); *F17C 2227/0306* (2013.01); *F17C 2250/03* (2013.01); *F17C 2250/043* (2013.01); *F17C 2250/0439* (2013.01); *F17C 2250/0443* (2013.01); *F17C 2250/0621* (2013.01); *F17C 2250/0636* (2013.01); *F17C 2265/065* (2013.01)

(58) Field of Classification Search
CPC ...... F17C 2227/0135; F17C 2227/0306; F17C 2250/03; F17C 2250/043; F17C 2250/0439; F17C 2250/0443; F17C 2250/0621; F17C 2250/0636; F17C 2265/065; F17C 7/04
See application file for complete search history.

(56) References Cited

U.S. PATENT DOCUMENTS

| | | | | |
|---|---|---|---|---|
| 7,069,730 | B2 * | 7/2006 | Emmer | F17C 5/007 62/48.1 |
| 10,634,283 | B2 | 4/2020 | Nagura et al. | |
| 10,961,109 | B2 | 3/2021 | Li et al. | |
| 11,009,185 | B2 | 5/2021 | Li et al. | |
| 11,155,459 | B2 | 10/2021 | Crispel et al. | |
| 2007/0101763 | A1 * | 5/2007 | Garnier | F25J 3/04963 62/643 |
| 2008/0115508 | A1 | 5/2008 | Kotzot et al. | |
| 2015/0033765 | A1 * | 2/2015 | Blalock | F17C 7/04 62/47.1 |
| 2018/0320637 | A1 | 11/2018 | Lee et al. | |
| 2020/0095113 | A1 * | 3/2020 | Crispel | B67D 7/36 |
| 2020/0156923 | A1 | 5/2020 | Li et al. | |
| 2022/0017358 | A1 | 1/2022 | Crispel et al. | |
| 2022/0204337 | A1 * | 6/2022 | Stager | F17C 13/026 |
| 2024/0218976 | A1 * | 7/2024 | Allidieres | F17C 7/04 |
| 2024/0218977 | A1 * | 7/2024 | Allidieres | F17C 7/04 |

OTHER PUBLICATIONS

PCT/US2023/068056p—International Preliminary Report dated Dec. 19, 2024, 7 pp.

PCT/US2023/068056—International Search Report and Written Opinion dated Sep. 25, 2023, 10 pp.

* cited by examiner

SYSTEMS AND METHODS FOR DISPENSING CRYOGENIC LIQUID FUEL AS A GAS AT CONTROLLED TEMPERATURE USING CRYOGENIC FLUID

CROSS REFERENCE TO RELATED APPLICATIONS

This application claims priority benefit under Section 35 U.S.C. § 119(e) of U.S. Provisional Application No. 63/365,972 filed Jun. 7, 2022, entitled, "METHOD AND SYSTEM FOR DISPENSING CRYOGENIC LIQUID FUEL AS A GAS AT CONTROLLED TEMPERATURE WITH SPLIT-STREAM HEAT EXCHANGE AND NON-CRYOGENIC MIXING", which is incorporated herein by reference in its entirety.

This application is also related to U.S. Provisional Application No. 63/366,176 filed Jun. 10, 2022, entitled, "METHOD FOR MIXING AND DISPENSING OF GAS AT A CONTROLLED TEMPERATURE USING CRYOGENIC FLUID", which is incorporated herein by reference in its entirety.

TECHNICAL FIELD

Aspects disclosed herein relate, generally, to controlling the temperature of dispensed hydrogen gas (and other fuels, such as Compressed Natural Gas) that is initially stored as cryogenic liquid, gas, or mixed gas/liquid. The flow and control schemes presented are applicable to fuel dispensing stations, fuel production plants, mobile fuel dispensing systems, and other areas. While the above description of the technical field represents a few areas of specific interest, it is not inclusive of all applications for this invention.

BACKGROUND OF THE INVENTION

Cryogenic liquids, such as liquid hydrogen or other fuel sources (e.g., Liquified Natural Gas (LNG), etc.) commonly stored as cryogenic liquid, may be used as a fuel source for fuel cell dependent vehicles and devices in a variety of applications, such as to provide motive power to vehicles, to power stationary power plants, to provide heating or other electrical needs to homes, etc. All fuel cell powered devices require mechanisms for supplying fuel which is generally stored as cryogenic liquid. Cryogenic liquid hydrogen may be supplied from a local storage container, or from mobile or stationary fueling stations.

The general refueling process of hydrogen fuel powered vehicles and systems is to periodically refill a local storage container in the same way gasoline is periodically used to refill the local storage containers in conventional internal combustion engine vehicles. For portable, mobile or stationary fueling stations, a local storage tank/vessel or a removeable/replaceable storage tank/vessel may be employed, these situations requiring cryogenic fuel be delivered to a portable, mobile or stationary fueling station and then stored until being delivered to another storage container or vehicle on board tank, fuel cell, or other hydrogen-consuming part of the fueling station itself.

Generally, hydrogen fueling stations utilize electrically powered refrigeration systems including heat exchangers to maintain consistent dispensing fuel temperatures by flowing cooled refrigerant through the heat exchanger in parallel to the hydrogen fuel at various points in the fueling system. Refrigerant systems may be physically large and may surround a portion of the cryogenic fuel source so as to constantly exchange heat and maintain system temperatures. Such systems may also be associated with high electricity costs. Refrigeration systems for cooling fuel may limit the number of stations or dispensers which may be employed at a stationary refueling site and the amount of fuel which may be transported in a mobile fueling station, ultimately limiting the number of vehicles which may effectively be fueled at one time or consecutively at any station.

Thus, a need exists for efficient systems and methods for controlling a temperature of hydrogen (or other fuel) to be dispensed.

SUMMARY OF THE INVENTION

The present invention provides, in a first aspect, a method for mixing and dispensing fuel which includes flowing cryogenic fuel from a storage tank towards a first flow path and a second flow path and separating the cryogenic fuel into a first stream and a second stream. The method includes flowing the first stream in the first flow path through a vaporizer to a warm inlet of a process heat exchanger, flowing the second stream in the second flow path to a cold inlet of the process heat exchanger, flowing the first stream through a warm portion of the process heat exchanger to exchange heat with the second stream, and flowing the second stream through a cold portion of a process heat exchanger to exchange heat with the first stream. The method further includes flowing the first stream from a warm outlet of the process heat exchanger to a mixing point, flowing the second stream from a cold outlet of the process heat exchanger to the mixing point, combining the first stream and the second stream to obtain a target stream, and dispensing the target stream through at least one dispenser.

The present invention provides, in a second aspect, a system for mixing and dispensing fuel including a temperature adjustment loop connected to a mixing loop. The temperature adjustment loop includes a storage tank configured to hold a first fuel, a first flow path coupled upstream to the storage tank and coupled downstream to a warm portion of a process heat exchanger, the first flow path having a first vaporizer, and a second flow path coupled upstream to the storage tank and coupled downstream to a cold portion of the process heat exchanger, the second flow path bypassing the first vaporizer. The mixing loop includes a third flow path coupled upstream to the warm portion of the process heat exchanger and coupled downstream to a terminal flow path, and a fourth flow path coupled upstream to the cold portion of the process heat exchanger and coupled downstream to the terminal flow path, wherein the terminal flow path is coupled downstream to at least one dispenser.

The present invention provides, in a third aspect, a system for mixing and dispensing fuel including a temperature adjustment loop connected to a mixing loop. The temperature adjustment loop includes a storage tank configured to hold a fuel, and a pump coupled to the storage tank and configured to pump the fuel from the storage tank to a first flow path and a second flow path. The first flow path has a first vaporizer, and the second flow path bypasses the first vaporizer. The system further includes a process heat exchanger having a warm portion and a cold portion, the first flow path coupled to the warm portion and the second flow path coupled to the cold portion to permit the fuel flowing through the first flow path to exchange heat with the fuel flowing through the second flow path. The mixing loop includes a third flow path coupled upstream to the warm portion of the process heat exchanger and coupled downstream to a terminal flow path, the fuel flowing along the third flow path to the terminal flow path to mix with the fuel from the fourth flow path. A fourth flow path is coupled upstream to the cold portion of the process heat exchanger and coupled downstream to a terminal flow path, the fuel passing flowing along the fourth flow path to the terminal flow path to mix with the fuel from the third flow path, and the terminal flow path coupled downstream to at least one dispenser for dispensing the fuel.

BRIEF DESCRIPTION OF THE DRAWINGS

The subject matter which is regarded as the invention is particularly pointed out and distinctly claimed in the claims at the conclusion of the specification. The foregoing and other features and advantages of the invention will be readily understood from the following detailed description of the preferred embodiments taken in conjunction with the accompanying drawings in which:

DETAILED DESCRIPTION OF THE INVENTION

Aspects will be discussed hereinafter in detail in terms of various exemplary embodiments according to the present disclosure with reference to the accompanying drawings. In following the detailed description, numerous specific details are set forth in order to provide a thorough understanding of the present disclosure. It will be obvious, however, to those skilled in the art that the present invention may be practiced without these specific details. In other instances, well-known structures are not shown in detail in order to avoid unnecessary obscuring of the present invention.

Furthermore, there is no intention to be bound by any expressed or implied theory presented in the preceding technical field, background, brief summary, or the following detailed description. It is also understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

In accordance with the principles of the present invention, systems, and methods for dispensing cryogenic liquid fuel as a gas at controlled temperatures are provided. Aspects may control the temperature of the fuel at the point of dispensing to be within a specified control window, typically below ambient temperature (e.g., −40C to −33C for hydrogen, such as required by SAE J2601 fueling protocol for T40 fueling, or similar). Aspects of the systems and methods disclosed herein may control a desired/target fuel dispensing temperature over an extensive range of typical ambient temperatures. The typical ambient temperature range is expected to be from −40C to +50C, such as in SAE J2601 fueling protocol for light duty hydrogen fueling.

Figure 1:
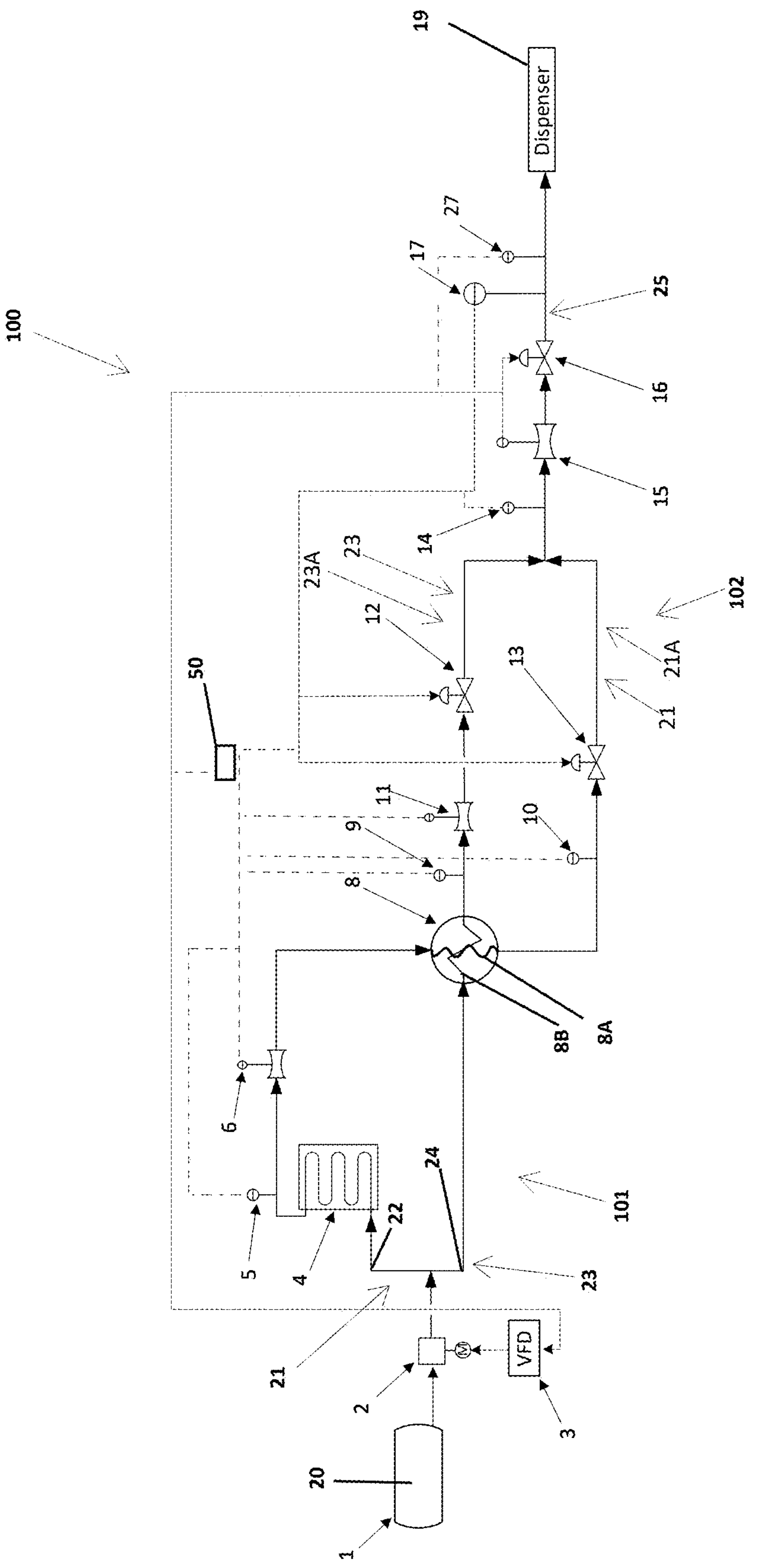
FIG. 1 is a schematic diagram view of one embodiment of a system for mixing and dispensing hydrogen fuel.

Referring now to FIG. 1, an example of a system 100 for dispensing cryogenic liquid fuel as a gas at a controlled temperature is provided. The system 100 may include a pump 2 configured to pass a process fluid or fuel 20 (e.g., cryogenic Hz, LNG, or other process fluid(s)/gas(ses)) from a storage vessel 1 (e.g., a cryogenic storage tank) through a temperature conditioning loop 101 and a mixing loop 102. Notably, aspects of the system 1 described herein may be connected by various conduits (not shown) configured to hold and/or transfer the fuel 20 proceeding through the system 100. For example, the various conduits may include, inter alia, tubing and/or piping connecting the pump 2 to the storage vessel 1. The various conduits may connect and/or couple various components of the system 100, especially those components through which the fuel 20 may pass, as described in more detail below. While the conduits may not always be directly described, one skilled in the art would know and appreciate from the present disclosure where and how the various conduits may be located to facilitate the connections between various components of the system 1 described herein. For example, aspects of the present disclosure include various pathways along which the fuel 20 is to flow during operation of the system 100; these pathways (i.e., flow paths) may be formed by, and may depend on, at least in-part, the various conduits permitting fluid communication between components in the system 100, as described in more detail below.

In the temperature conditioning loop 101, the pump 2 may flow (i.e., pump) the fuel 20 (e.g., via conduit(s)) to a first flow path 22 and a second flow path 24. The fuel 20 may be proportioned into a first stream 21 to flow along the first flow path 22 and a second stream 23 to flow along the second flow path 24, wherein the proportioning may be achieved by a control valves 12 and 13 located downstream (i.e., in a direction from the storage vessel 1 towards at least one dispenser 19) from the pump 2 and upstream (i.e., in a direction from the at least one dispenser 19 towards the storage vessel 1) from a terminal flow path 25. Note that a single three-way valve, a manifold, a plurality of orifices, and/or a single control valve or a combination thereof may be used in place of the control valve 12 and 13 to provide a correct proportioning, and direct the fuel 20, between the first flow path 22 and the second flow path 24. There may be other structure(s) sufficient to correctly proportion the fuel 20 between the first stream 21 and the second stream 23 which one skilled in the art would appreciate and understand from the aspects disclosed herein. The pump 2 and/or the control valves 12 and 13 may be coupled to a controller as described in more detail below.

The first flow path 22 may include a vaporizer 4, a first temperature sensor 5 (e.g., a temperature transducer), and a first flow meter 6. The vaporizer 4 may be an ambient heat exchanger (i.e., a heat exchanger in which ambient air is used to control a temperature of the fuel 20 to near ambient temperatures), an electrically powered vaporizer, or another means of controlling the temperature of the fuel 20 depending on the requirements of the system 100. Such an ambient heat exchanger (e.g., vaporizer 4) may be a natural draft heat exchanger or a forced draft heat exchanger. The first stream 21 may be flowed (e.g., via conduit(s)) along the first flow path 22 to the vaporizer 4 which heats/warms the first stream 21 to above cryogenic temperature(s). The first stream 21 may then continue to flow (e.g., via conduit(s)) along the first flow path 22 towards a process recuperator heat exchanger 8 (e.g., a process-process heat exchanger), as described in more detail below.

As ambient temperatures decrease, the surface area of an ambient heat exchanger (i.e., vaporizer) required to maintain a necessary approach temperatures (i.e., the necessary temperatures of the fuel 20 at various points in the system 100 prior to mixing/recombining) increases. Therefore, where ambient temperatures are cold, an ambient natural draft or forced draft heat exchanger (i.e., vaporizer) may not be practical to employ for the vaporizer 4. For cold weather applications, a steam or hot water heater water bath vaporizer (i.e., heat exchanger), a natural gas direct fired water bath vaporizer (i.e., heat exchanger), an electricity heated vaporizer (i.e., heat exchanger), or an electric heater water bath vaporizer (i.e., heat exchangers) may be used for the vaporizer 4 to control the temperature(s) and reduce the heat exchange surface area. These types of vaporizers may also be used to reduce an environmental footprint of the system 100 as well. As deemed necessary on a case-by-case basis, the vaporizer 4 may be replaced with any type of vaporizer/heat exchanger which is safe, economical, and of satisfactory performance with respect to the system 100 requirements to reduce system 100 footprint, reduce the impact of external disturbances (e.g., changes in ambient conditions), and/or to control the outlet temperature and/or a desired dispensing temperature of the fuel 20 more finely.

The first temperature sensor 5 (e.g., a temperature transducer) and/or the first flow meter 6 may be located in the temperature conditioning loop 101. The first temperature sensor 5 and the first flow meter 6 may be coupled to the controller 50 and may transmit and/or send information to the controller 50, as described in more detail below. In an example shown in FIG. 1 the first temperature sensor 5 and/or the first flow meter 6 may be located in the first flow path 22 downstream (i.e., in a direction from the storage vessel 1 toward vaporizer 4) from the vaporizer 4. As the first stream 21 exits the vaporizer 4 and proceeds along the first flow path 22, the first temperature sensor 5 may monitor, measure, and/or record the temperature of the first stream 21 and may transmit and/or send recorded information about the temperature to the controller 50. Similarly, as the first stream 21 exits the vaporizer 4 and proceeds along the first flow path 22, the first flow meter 6 may monitor, measure, and/or record a flow rate (e.g., volume of fuel flowing through a given cross sectional area per unit of time) of the first stream 21 and may transmit and/or send recorded information about the flow rate to the controller 50.

Depending on ambient temperatures, pump discharge temperature and dispensing temperature and other requirements of the system 100 and/or circumstances, there may be a variable rate of flow between the first stream 21 flowing along the first flow path 22 and the second stream 23 flowing along the second flow path 24. For example, ambient temperatures may demand that a higher or lower volume of the fuel 20 be pumped along the first flow path 22 relative to the fuel 20 pumped along the second flow path 24 to achieve the desired dispensing temperature, or vice versa.

The second stream 23 is flowed (e.g., via conduit(s)) along the second flow path 24 and bypasses the vaporizer 4, proceeding towards the process recuperator heat exchanger 8 (e.g., a process-process heat exchanger). Because the second stream 23 bypasses the vaporizer 4, the second stream 23 may therefore be colder than the first stream 21 after the first stream 21 has been warmed in/by the vaporizer 4.

Figure 2:
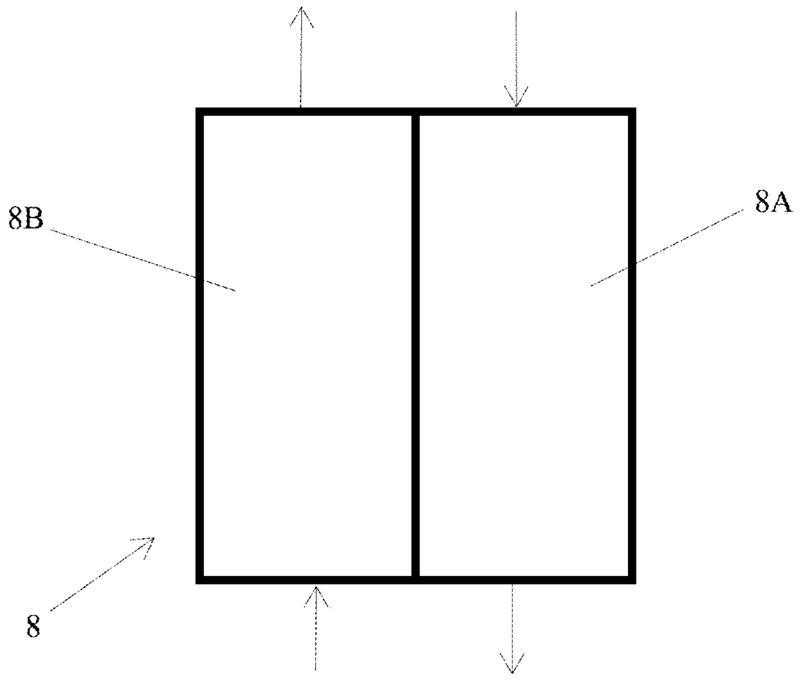
FIG. 2 is a schematic diagram view of a process recuperator heat exchanger of the system of FIG. 1.

As depicted in FIGS. 1-2, the process recuperator heat exchanger 8 (e.g., process-process heat exchanger) may include two nonmixing pathways or portions—a warm portion 8A which may be located in and/or coupled (e.g., via conduit(s)) to the first flow path 22, and a cold portion 8B which may be located in and/or coupled (e.g., via conduit(s)) to the second flow path 24—which may permit heat to transfer between the first stream 21 (i.e., the fuel 20 flowing along the first flow path 22) and the second stream 23 (i.e., the fuel 20 flowing along the second flow path 24). For example, the first stream 21 may be flowed along the first flow path 22 to/through the warm portion 8A of the process recuperator heat exchanger 8 where it may exchange heat with the second stream 23, and the second stream 23 may be flowed along the second flow path 24 to/through the cold portion 8B of the process recuperator heat exchanger 8 where it may exchange heat with the first stream 21. As the first stream 21 and the second stream 23 exchange heat, the temperatures of both streams 21, 23 approach each other (e.g., the temperature of the first stream 21 may decrease, and the temperature of the second stream may increase).

An advantage of such a heat exchange between the first stream 21 and the second stream 23 before recombining is that the system 100 is able to bring the fuel 20 to above cryogenic temperatures and thus avoids directly mixing a cold/cryogenic stream with a warm vaporizer discharge, which may cause pressure spikes, vibrations, and/or safety hazards which may damage the system 100 or cause injury. The reduction in temperature differential between the two streams 21, 23, prior to recombination (i.e., mixing) reduces, mitigates, and/or eliminates the risk of flashing liquid or local volume expansion and/or contraction present when directly mixing a cryogenic fluid with an ambient temperature fluid. The reduction in temperature differential between the first stream 21 and the second stream 23 also increases the controllability of the system 100 to achieve the desired dispensing temperature since the enthalpy of the two streams 21, 23 are more similar during mixing (i.e., at the time/location of mixing/recombining) and therefore less sensitive to changes in rate of flow therebetween.

The process recuperator heat exchanger 8 may be the final component in the temperature conditioning loop 101 (i.e., the final component to process the fuel 20 before the fuel 20 proceeds to the mixing loop 102) and may be coupled downstream to the mixing loop 102. That is, as the fuel 20 exits the process recuperator heat exchanger 8 (i.e., as the first stream 21 exits the warm portion 8A and proceeds along the first flow path 22, and as the second stream 23 exits the cold portion 8B and proceeds along the second flow path 24), the fuel 20 can be said to have exited and/or completed flowing through the temperature conditioning loop 101 and entered and/or begun flowing (e.g., via conduit(s)) through the mixing loop 102. While the first flow path 22 and the second flow path 24 are referred to herein as being continuous through both the temperature conditioning loop 101 and the mixing loop 102, it may also be appropriate to consider the first flow path 22 and the second flow path 24 as terminating at the process recuperator heat exchanger 8, wherein the portion of the first flow path 22 extending from the process recuperator heat exchanger 8 to a terminal flow path 25 may be referred to as a third flow path 22A, and the portion of the second flow path 24 extending from the process recuperator heat exchanger 8 to the terminal flow path 25 may be referred to as a fourth flow path 23A.

The mixing loop 102 may include the first flow path 22 (along which the first stream 21 may proceed), the second flow path 24 (along which the second stream 23 may proceed), and the terminal flow path 25 for mixing the fuel 20 from the first flow path 22 and the second flow path 24 to a desired dispensing temperature (e.g., –40° to 0° F.). The first stream 21 may flow along the first flow path 22 towards and/or to the terminal flow path 25, and the second stream 23 may flow along the second flow path 24 towards and/or to the terminal flow path 25. The terminal flow path 25 may be coupled to and/or in fluid communication with both the first flow path 22 and the second flow path 24 to permit the first stream 21 and the second stream 23 (i.e., the fuel 20 flowing along the first flow path 22 and the second flow path 24) to enter and/or be mixed in the terminal flow path 25.

In an example shown in FIG. 1, control over the mixing loop 102 or, more specifically, over mixing of the first stream 21 and the second stream 23 in the terminal flow path 25 to achieve the desired dispensing temperature, may be achieved by the controller 50 and/or an operator of the system 100 adjusting the flow proportioning of the fuel 20 to enter the terminal flow path 25 from the first stream 21 relative to the second stream 23 via temperature control valves 12, 13. The temperature control valves 12, 13 may be located in the mixing loop 102, for example. A first temperature control valve 12 of the temperature control valves 12, 13 may be located in and/or in fluid communication with the first flow path 22 and a second temperature control valve 13 of the temperature control valves 12, 13 may be located in and/or in fluid communication with the second flow path 24. The temperature control valves 12, 13 may thus include temperature sensors to take temperature readings of the fuel 20 in the first flow path 22 and the second flow path 24, and the temperature control valves 12, 13 may control a flow therethrough based on such readings, as described in more detail below.

Placing the temperature control valves 12, 13 into separate streams creates split action control over the flow of the fuel 20 through the system, wherein both temperature control valves 12, 13 act together, one increasing the resistance in one flow path (i.e., one of the first flow path 22 or the second flow path 24) when closed and/or narrowed, while the other reduces the resistance in the other flow path (i.e., the other of the first flow path 22 or the second flow path 24) when widened and/or opened and forcing the flow in a desired direction, which may permit faster response times to adjustments in the system (e.g., dynamic changes in flow, environmental, and/or desired dispensing temperature conditions) and may permit finer control over the two streams 21, 23 when compared to systems which employ only one valve in the second flow path 24. Note that a single three-way mixing valve, a manifold, and/or a plurality of orifices, or a combination thereof may be acceptable in place of any or all of the temperature control valves 12, 13 to adjust the flow proportioning of the fuel 20 from the two flow paths 22, 24 to be mixed in the terminal flow path 25. Any or all of the temperature control valves 12, 13 may be coupled to the controller 50 as described in more detail below.

In an example shown in FIG. 1, the mixing loop 102 may include a second temperature sensor 9 (e.g., a temperature transducer), a third temperature sensor 10 (e.g., a temperature transducer), and/or a second flow meter 11, any or all of which may be coupled to the controller 50 as described in more detail below. The second temperature sensor 9 and/or the second flow meter 11 may be located in the first flow path 22 downstream from the process recuperator heat exchanger 8 and upstream from the first temperature control valve 12. Alternatively, in another embodiment not shown the second flow meter 11 may be located in the second flow path 24 downstream from the process recuperator heat exchanger 8 and upstream from the second temperature control valve 13. As the first stream 21 flows through the mixing loop 102 towards the terminal flow path 25, the second temperature sensor 9 may monitor, measure, and/or record the temperature of the first stream 21, and may send and/or transmit recorded information to the controller 50. The second flow meter 11 may monitor, measure, and/or record a flow rate (e.g., volume of fuel flowing through a given cross sectional area per unit of time) of the first stream 21 and may send and/or transmit recorded information to the controller 50. The third temperature sensor 10 may be located in the second flow path 24 downstream from the process recuperator heat exchanger 8 and upstream from the second temperature control valve 13. As the second stream 23 flows through the mixing loop 102 towards the terminal flow path 25, the third temperature sensor 10 may monitor, measure, and/or record the temperature of the second stream 23 and may send and/or transmit collected information to the controller 50. As the two steams 21, 23 reach the terminal flow path 25 the two streams 21, 23 are mixed (i.e., recombined) to the desired dispensing temperature.

When the system 100 and/or an operator of the system 100 detects, predicts, projects, and/or indicates (i.e., signals) (e.g., via the second temperature sensor 9 and/or the third temperature sensor 10) a higher temperature of the first stream 21 relative to the second stream 23, such that the fuel 20 from the first stream 21 and the second stream 23 would predictably mix in the third stream 25 to an undesired dispensing temperature that is warmer than the desired dispensing temperature, one adjustment which may be made by the operator and/or the controller 50 is to decrease the ratio of the fuel 20 being mixed from the first stream 21 (which has been warmed in the vaporizer 4) relative to the second stream 23 (which bypassed the vaporizer 4). Decreasing the ratio of the fuel 20 being mixed from the first stream 21 (i.e., from the first flow path 22) relative to the second stream 23 (i.e., from the second flow path 24) may be accomplished, for example, by adjusting the size of openings of the temperature control valves 12, 13 to restrict the volume of the fuel 20 from the first stream 21 being mixed relative to the volume of the fuel 20 from the second stream 23, or to permit a higher volume of the fuel 20 from the second stream 23 to be mixed relative to the first stream 21.

When the system 100 and/or an operator of the system 100 detects, predicts, projects, and/or indicates (i.e., signals) (e.g., via the second temperature sensor 9 and/or the third temperature sensor 10) a lower temperature of the first stream 21 relative to the second stream 23, such that the fuel 20 from the first stream 21 and the second stream 23 would predictably mix in the third stream 25 to an undesired dispensing temperature that is colder than the desired dispensing temperature, one adjustment which may be made by the operator and/or the controller 50 is to increase the ratio of the fuel 20 being mixed from the first stream 21 (which has been warmed in the vaporizer 4) relative to the second stream (which bypassed the vaporizer 4). Increasing the ratio of the fuel 20 being mixed from the first stream 21 (i.e., from the first flow path 22) relative to the second stream 23 (i.e., from the second flow path 24) may be accomplished, for example, by adjusting the size of openings of the temperature control valves 12, 13 to permit a higher volume of the fuel 20 from the first stream 21 being mixed relative to the volume of the fuel 20 from the second stream 23, or to restrict the volume of the fuel 20 from the second stream 23 to be mixed relative to the first stream 21.

Changes in temperature (i.e., heat gains) which may occur beyond the point of mixing (i.e., after the fuel 20 in the two streams 21, 23, reach the terminal flow path 25) the fuel 20 to the desired dispensing temperature due to, e.g., ambient conditions, may be countered (i.e., compensated for) by targeting a lower mixing temperature.

In an example shown in FIG. 1, the terminal flow path 25 may include a fourth temperature sensor 14 (e.g., a temperature transducer), a third flow meter 15, a flow control valve 16, a fifth temperature sensor 17 (e.g., a temperature transducer), a second pressure sensor 27, and/or the at least one dispenser 19, each of which may be coupled to the controller 50, as described in more detail below. The fuel 20 in the first stream 21 (i.e., in the first flow path 22) and the second stream 23 (i.e., in the second flow path 24) may be mixed to the desired dispensing temperature in the terminal flow path 25 prior to being dispensed from the at least one dispenser 19. The total dispensed flow of the fuel 20 may independently be controlled by the flow control valve 16 (as opposed to by the temperature control valves 12, 13). Note that a manifold, a plurality of orifices, and/or a single control valve or a combination thereof may be used in place of the flow control valve 16 to control a dispensing flow rate of the fuel 20. The dispensing flow rate of the fuel 20 may be adjusted based on, for example, a predetermined fueling protocol (e.g., SAE J2601).

As shown in FIG. 1, the second pressure sensor 27 and/or the third flow meter 15 may be located in the terminal flow path 25 downstream from the flow control valve 16 and upstream from the at least one dispenser 19. The pressure sensor 27 may monitor, measure, and/or record the pressure of the fuel 20 in the terminal flow path 25 prior to being dispensed from the at least one dispenser 19, and may send and/or transmit recorded information to the controller 50. Similarly, the third flow meter 15 may monitor, measure, and/or record the flow rate of the fuel in the terminal flow path 25 prior to being dispensed from the at least one dispenser 19, and may send and/or transmit recorded information to the controller 50.

When the system 100 and/or an operator of the system 100 detects, predicts, projects, and/or indicates (i.e., signals) (e.g., via the second pressure sensor 27) a dispensing pressure of the fuel 20 which is higher or lower than a desired dispensing pressure, one adjustment which may be made by the controller 50 and/or the operator is to decrease (when the pressure is high) or increase (when the pressure is low) the pressure of the fuel 20 at various other points and/or locations throughout the system. For example, the controller 50 and/or the operator may increase or decrease the rate at which the pump 2 flows the fuel 20 through the system to increase or decrease the pressure of the fuel 20. Alternatively, the controller 50 and/or the operator may change the size of various openings in various valves (e.g., the control valve 26, the temperature control valves 12, 13, and/or the flow control valve 16) without changing the flow rate of the fuel as it proceeds through the system 100 (e.g., via conduit(s)), such that the pressure of the fuel must be increased to maintain the same flow rate.

When the system 100 and/or an operator of the system 100 detects, predicts, projects, and/or indicates (i.e., signals) (e.g., via the flow meter 15) a higher flow rate of the fuel 20 in the terminal flow path 25 than is desirable for dispensing the fuel 20 via the at least one dispenser 19, one adjustment which may be made by the operator and/or the controller 50 is to decrease the rate of flow of the fuel 20 in the terminal flow path 25 downstream from the flow control valve 16, such that the fuel 20 which is dispensed from the at least one dispenser 19 has a lower flow rate. One way to decrease the flow rate of the fuel 20 in the terminal flow path 25 downstream from the flow control valve 16 is to reduce the speed of the pump 2 and restrict the size of an opening(s) of the flow control valve 16 such that a lower volume of the fuel 20 is able to pass through the terminal flow path 25 at a given/particular time.

When the system 100 and/or an operator of the system 100 detects, predicts, projects, and/or indicates (i.e., signals) (e.g., via the flow meter 15) a lower flow rate of fuel 20 in the terminal flow path 25 than is desirable for dispensing the fuel 20 via the at least one dispenser 19, one adjustment which may be made by the operator and/or the controller 50 is to increase the rate of flow of the fuel 20 in the terminal flow path 25 downstream from the flow control valve 16, such that the fuel 20 which is dispensed from the at least one dispenser 19 has a higher flow rate. One way to increase the flow rate of the fuel 20 in the terminal flow path 25 downstream from the flow control valve 16 is to increase the speed of the pump 2 and increase the size of the opening(s) of the flow control valve 16 such that a higher volume of the fuel 20 is able to pass through the terminal flow path 25 at a given/particular time.

When independent flow control valve(s) (e.g., the flow control valve 16) and temperature valve(s) (e.g., the temperature control valves 12, 13) are employed, the flow and temperature (e.g., of the first stream 21 and/or the second stream 23) may both be controlled simultaneously. However, where there are only temperature control valves and those temperature control valves are also used to regulate total flow control, the positions of the temperature control valve(s) must first adjust to accommodate the total flow and then must be readjusted to achieve the desired dispensing temperature of the fuel 20. Thus, the independent flow control valve 16 in conjunction with the temperature control valves 12, 13 controls the flow and temperature relatively more quickly than controlling both temperature and flow with only two temperature control valves.

As shown in FIG. 1, the fourth temperature sensor 14 (e.g., a temperature transducer) may be located in the terminal flow path 25 upstream from the flow control valve 16, while the fifth temperature sensor 17 (e.g., a temperature transducer) may be located in the terminal flow path 25 downstream from the flow control valve 16. Both the fourth temperature sensor 14 and the fifth temperature sensor 17 may monitor, measure, and/or record the temperature of the fuel 20 in the third stream 25, and may send and/or transmit recorded information to the controller 50. The controller 50 and/or an operator of the system 100 may adjust the size of the various valves (e.g., the temperature control valves 12, 13 and/or the flow control valve 16), and/or may controllably adjust pump speed via VFD, in response to the information collected by the fourth temperature sensor 14 and/or the fifth temperature sensor 17, similarly to how the controller 50 and/or an operator of the system 100 may make adjustments in response to information gleaned from the first temperature sensor 5, the second temperature sensor 9, and/or the third temperature sensor 10, as described above.

The controller 50 may be configured to perform aspects of the disclosed method autonomously (including semi-autonomously), with other aspects of the system 100 sharing information therewith in order to perform those aspects of the present disclosure, as described above. In some embodiments (not depicted), there may be more or less than one controller performing the function of the controller 50. Specifically, the controller 50 may be configured to control and/or direct various aspects of the process and/or the system 100 described herein to, inter alia, modify and/or regulate the flow rate and/or the temperature and/or the pressure of the fuel 20 as the fuel 20 proceeds through the system 100 (i.e., at various locations of the system 100 and during various aspects of the process). For example, the controller 50 may be coupled to the pump 2 to control the rate at which fuel 20 is pumped through the system 100 or any part thereof. The controller 50 may also be coupled to the first temperature sensor 5 and/or the first flow meter 6 to permit the controller 50 to automatically determine a temperature and a flow rate of the fuel 20 and to regulate and/or modify the ratio of the fuel 20 which is apportioned to the first flow path 22 relative to the second flow path 24 in response to such a determination and/or based on a desired dispensing temperature of the fuel 20. Similarly, the controller 50 may be coupled to the temperature control valves 12, 13, the second temperature sensor 9, the third temperature sensor 10, and/or the second flow meter 11 to automatically determine a temperature and a flow rate of the fuel 20 in the first flow path 22 and the second flow path 24, and, in response to such a determination and/or based on a desired dispensing temperature of the fuel 20, to regulate and/or modify the ratio of the fuel 20 which is apportioned to the terminal flow path from the first flow path 22 relative to the fuel 20 which is apportioned from the second flow path 24 to the terminal flow path 25.

The controller 50 may be coupled to a pump 2 which may be one or a plurality of variable motor speed reciprocating pumps (e.g., a pump with a variable frequency drive (VFD) 3 or a plurality of VFDs (not shown)) that increase or decreases the flow rate of the fuel 20 sufficiently through the system and into the vehicle(s) and/or container(s) connected to the at least one dispenser 19. The controller 50 and/or an operator of the system may monitor, and may know to regulate, and/or make adjustments to the pump (and thus, to the pressure and flow rate of the fuel 20 flowing through the system 100 at various points and/or locations of the system 100), via pressure sensors (e.g., the pressure sensor 27 and/or a pressure sensor (not depicted) in the at least one dispenser 19) and the flow meter 15.

The control over the VFD(s) 3 by the controller 50 to dynamically drive components may allow the pump 2 and/or other components to continuously increase and decrease in speed when started, stopped, and/or during operation of the system 100 based on the needed dispensing flowrate of the fuel 20 and the system back pressure. Thus, the coarse adjustment(s) to pressure and/or flow rate of the fuel 20 may be performed via the pump 2 and the VFD(s) 3, while the fine-tuned flow control may be achieved by the flow control valve 16. In an embodiment of the system 100 not depicted, the flow control valve 16 may be eliminated and the system 100 may rely entirely on adjustment of the pump speed alone for overall flow control.

The VFD(s) 3 may also be manually adjusted to optimize motor speed for components such as the pump 2. The controller 50 may include a programmable logic controller (PLC) which may include a screen (e.g., a color touchscreen) and an interface for programming operational sequencing of various process steps and/or to permit manual regulation of the system 100, including ramping functions for the VFD(s) 3, pumpdown sequences, and maintenance and tuning modes. The controller 50 may be configured to monitor various aspects of the system via information received from various sensors (e.g., temperature, pressure, and flow sensors as described above) and, if the controller 50 detects operation outside of predetermined operating ranges, to take action to correct the process and/or to safeguard equipment and personnel, such as by modifying the operation of various aspects, shutting down the system, etc.

The controller 50 may also connect to the Internet (e.g., via any known internet connection protocol) to allow remote access to and monitoring of the system 100 during operation, and to provide notifications regarding system maintenance and status. The controller may be coupled to other components in addition to those explicitly described herein, such as other valves or sensors, to permit regulating, measuring, recording, and/or monitoring of the temperature, rate of flow, pressure, and/or other metrics of the fuel 20 at various points during the process and/or at various locations in the system 100. Alternatively, where the controller 50 is absent, an operator of the system 100 may perform those aspects manually which may otherwise be performed by the controller 50.

The flow scheme of the system 100 may be employed on mobile systems as well as on stationary filling designs and may permit dispensing of the fuel 20 via the at least one dispenser 19 to a vehicle, a container, a plurality of vehicles, and/or a plurality of containers. The components of the system 100 (including various conduits not shown which connect the components describe above) may be either located near the at least one dispenser 19 or remotely away from the at least one dispenser 19 at the fueling station depending on the requirements of the station and/or station layout on a case-by-case basis. The at least one dispenser 19 may be a single dispenser or a plurality of dispensers, and may be of the same or different type. Various piping and conduits may be used to connect and/or couple the various components of the system 100 described above. The flow scheme of the system 100 may be repeated (i.e., multiple of the system 100 running in parallel) to support the at least one dispenser 19 of the same type or different types. Alternatively, one large system (e.g., a scaled-up version of the system 100) may feed (e.g., flow fuel to) the at least one dispenser 19. The system 100 may be applied to any range of desired dispensing temperatures, for example, as mentioned above with respect to SAE J2601. The system 100 may be applied for any vehicle fueling pressure requirement per fueling protocol.

Aspects of the systems and methods disclosed herein provide a design which is simple, simple to operate, safe, and energy efficient. Aspects of the systems and methods disclosed herein for mixing and dispensing fuel (e.g., hydrogen fuel) at controlled temperatures may be advantageous because the systems operate without the additionally complexity and equipment necessary for a separate cooling loop, such as refrigerants, additional piping, storage containers, etc. Fundamentally, it is based on a direct heat exchange between segments of the same process fluid/fuel stream (e.g., Hz, LNG, CNG, etc.) that is dispensed for fueling without a need for external temperature control.

While several aspects of the present invention have been described and depicted herein, alternative aspects may be affected by those skilled in the art to accomplish the same objectives. Accordingly, it is intended by the appended claims to cover all such alternative aspects as fall within the true spirit and scope of the invention.

The invention claimed is:

1. A method for mixing and dispensing fuel comprising:

flowing cryogenic fuel from a storage tank towards a first flow path and a second flow path;

separating the cryogenic fuel into a first stream and a second stream;

flowing the first stream in the first flow path through a vaporizer to a warm inlet of a process heat exchanger;

flowing the second stream in the second flow path to a cold inlet of the process heat exchanger;

flowing the first stream through a warm portion of the process heat exchanger to exchange heat with the second stream, and flowing the second stream through a cold portion of the process heat exchanger to exchange heat with the first stream;

flowing the first stream from a warm outlet of the process heat exchanger to a mixing point;

flowing the second stream from a cold outlet of the process heat exchanger to the mixing point;

combining the first stream and the second stream to obtain a target stream; and dispensing the target stream through at least one dispenser.

2. The method of claim 1, wherein the separating the cryogenic fuel into the first stream and the second stream comprises separating the cryogenic fuel into the first stream and the second stream by controlling a flow of the cryogenic fuel through a first control valve or manifold and a second control valve or manifold, the first control valve or manifold connected to the first flow path and the second control valve or manifold connected to the second flow path.

3. The method of claim 1, wherein the dispensing the target stream through the at least one dispenser comprises dispensing the target temperature fuel stream to at least one vehicle through the at least one dispenser.

4. The method of claim 1, wherein the separating the cryogenic fuel into the first stream and the second stream comprises separating the cryogenic fuel into the first stream having a first volume and the second stream having a second volume, wherein the first volume and the second volume comprise different volumes relative to each other.

5. The method of claim 4, wherein the separating the cryogenic fuel into the first stream and the second stream further comprises automatically adjusting a ratio of the first volume relative to the second volume based on a desired temperature of the target stream.

6. The method of claim 1, wherein the separating the cryogenic fuel into the first stream and the second stream comprises separating the cryogenic fuel into the first stream having a first volume and the second stream having a second volume, wherein the first volume and the second volume comprise equal volumes.

7. The method of claim 1, wherein the separating the cryogenic fuel into the first stream and the second stream comprises separating the cryogenic fuel into the first stream having a first flow rate and a second stream having a second flow rate, wherein the first flow rate and the second flow rate comprise different flow rates relative to each other.

8. The method of claim 7, wherein the separating the cryogenic fuel into the first stream and the second stream further comprises automatically adjusting a ratio of the first flow rate relative to the second flow rate based on a desired temperature of the target stream.

9. The method of claim 1, wherein the separating the cryogenic fuel into the first stream and the second stream comprises separating the cryogenic fuel into the first stream having a first flow rate and a second stream having a second flow rate, wherein the first flow rate and the second flow rate comprise equal flow rates.

10. The method of claim 1, wherein the flowing the first stream in the first flow path through the vaporizer comprises warming the first stream to a first temperature which is higher than a second temperature of the second stream and lower than an ambient temperature of ambient air.

11. A system for mixing and dispensing fuel, comprising:

a temperature adjustment loop connected to a mixing loop, the temperature adjustment loop comprising:

a storage tank configured to hold a fuel, a first flow path configured to flow a first fuel stream of the fuel, the first flow path coupled upstream to the storage tank and coupled downstream to a warm portion of a process heat exchanger, the first flow path having a first vaporizer, and a second flow path configured to flow a second fuel stream of the fuel, the second flow path coupled upstream to the storage tank and coupled downstream to a cold portion of the process heat exchanger, the second flow path bypassing the first vaporizer; and the mixing loop comprising:

a third flow path coupled upstream to the warm portion of the process heat exchanger and coupled downstream to a mixing point wherein the third flow path is configured to receive the first fuel stream from the warm portion; and a fourth flow path coupled upstream to the cold portion of the process heat exchanger and coupled downstream to the mixing point, wherein the fourth flow path is configured to receive the second fuel stream from the cold portion;

wherein the first fuel stream and the second fuel stream are configured to be initially mixed at the mixing point to form a dispensing fuel stream, and a terminal flow path coupled upstream to the mixing point and coupled downstream to at least one dispenser.

12. The system of claim 11, further comprising a first control valve, manifold or plurality of orifices and a second control valve, manifold or plurality of orifices, the first control valve or manifold connected to the third flow path and the second control valve or manifold connected to the fourth flow path.

13. The system of claim 12, wherein the first control valve, manifold or plurality of orifices and/or the second control valve, manifold or plurality of orifices is coupled to a controller and a temperature sensor, the controller configured to automatically regulate the first volume and/or the second volume based on a desired temperature of the fuel and/or an ambient temperature of ambient air.

14. The system of claim 11, further comprising a mixing valve at the mixing point, the mixing valve having a first opening, a second opening, and a third opening, the first opening coupled to the third flow path, the second opening coupled to the fourth flow path, and the third opening coupled to the terminal flow path.

15. The system of claim 14, further comprising a temperature sensor located between the mixing valve and the at least one dispenser, wherein the temperature sensor is coupled to the mixing valve or to at least one control valve upstream from the mixing point to permit control over the ratio of the first fuel stream mixed with the second fuel stream based on a temperature reading of the first fuel stream in the first flow path relative to the second fuel stream in the second flow path.

16. The system of claim 11, wherein the first vaporizer comprises a natural draft heat exchanger, a forced draft heat exchanger, a steam or hot water heater water bath vaporizer, a natural gas direct fired water bath vaporizer, an electrically heated vaporizer, or an electric heater water bath vaporizer.

17. The system of claim 11, further comprising a flow meter configured to measure a flow rate of the fuel, the flow meter located in the first flow path, the second flow path, the third flow path, the fourth flow path, and/or the terminal flow path, the flow meter coupled to a controller, the controller coupled to a pump and configured to control a speed of the pump based on a flow rate of the fuel in the terminal flow path.

18. The system of claim 17, wherein the flow meter is coupled to a controller and to at least one mixing valve or control valve, the controller configured to automatically regulate a first flow rate of the first fuel stream in the third flow path relative to a second flow rate of the second fuel stream in the fourth flow path based on a temperature of the fuel in the terminal flow path and/or an ambient temperature of ambient air.

19. A system for mixing and dispensing fuel, comprising:

a temperature adjustment loop connected to a mixing loop, the temperature adjustment loop comprising:

a storage tank configured to hold a fuel, a pump coupled to the storage tank and configured to pump fuel from the storage tank to a first flow path and a second flow path, the first flow path having a first vaporizer and the second flow path bypassing the first vaporizer, and a process heat exchanger having a warm portion and a cold portion, the first flow path coupled to the warm portion and the second flow path coupled to the cold portion to permit the fuel flowing through the first flow path to exchange heat with the fuel flowing through the second flow path; and the mixing loop comprising:

a third flow path coupled upstream to the warm portion of the process heat exchanger and coupled downstream to a terminal flow path, the fuel flowing along the third flow path to the terminal flow path to mix with the fuel from the fourth flow path, and a fourth flow path coupled upstream to the cold portion of the process heat exchanger and coupled downstream to a terminal flow path, the fuel flowing along the fourth flow path to the terminal flow path to mix with the fuel from the third flow path; and the terminal flow path coupled downstream to at least one dispenser for dispensing the fuel.

* * * * *